(12) United States Patent
Harrington, Jr.

(10) Patent No.: US 10,160,377 B2
(45) Date of Patent: *Dec. 25, 2018

(54) LED FOG LAMP

(71) Applicant: MYOTEK PACIFIC CORP., Laguna Beach, CA (US)

(72) Inventor: Robert T. Harrington, Jr., Laguna Beach, CA (US)

(73) Assignee: Myotek Holdings, Inc., Irvine, CA (US)

( * ) Notice: Subject to any disclaimer, the term of this patent is extended or adjusted under 35 U.S.C. 154(b) by 187 days.

This patent is subject to a terminal disclaimer.

(21) Appl. No.: 15/141,863

(22) Filed: Apr. 29, 2016

(65) Prior Publication Data

US 2016/0243981 A1 Aug. 25, 2016

Related U.S. Application Data

(63) Continuation of application No. 13/753,145, filed on Jan. 29, 2013, now Pat. No. 9,327,640.

(51) Int. Cl.
| | |
|---|---|
| *B60Q 1/20* | (2006.01) |
| *B60Q 1/04* | (2006.01) |
| *F21S 41/147* | (2018.01) |
| *F21S 41/20* | (2018.01) |
| *F21S 41/39* | (2018.01) |
| *F21S 41/33* | (2018.01) |
| *F21S 41/36* | (2018.01) |
| *F21S 41/43* | (2018.01) |

(52) U.S. Cl.
CPC ............ *B60Q 1/20* (2013.01); *B60Q 1/0475* (2013.01); *F21S 41/147* (2018.01);
(Continued)

(58) Field of Classification Search
CPC ...... B60C 1/20; B60C 1/0475; F21S 48/1159; F21S 48/1225; F21S 48/1305;
(Continued)

(56) References Cited

U.S. PATENT DOCUMENTS

| | | | | |
|---|---|---|---|---|
| 2,255,819 A | * | 9/1941 | Salani | F21V 7/09 |
| | | | | 362/297 |
| 2,341,658 A | * | 2/1944 | Salani | F21V 7/00 |
| | | | | 362/297 |

(Continued)

OTHER PUBLICATIONS

Philips Lumlileds Lighting Company, Luxeon Altilon Automotive Forward Lighting Source, Technical Datasheet DS66, Mar. 20, 2013, 25 pages, available at http://www.philipslumileds.com/products/luxeon-altilon.

*Primary Examiner* — Evan Dzierzynski
*Assistant Examiner* — Naomi M Wolford
(74) *Attorney, Agent, or Firm* — Barnes & Thornburg LLP

(57) ABSTRACT

A fog lamp for use in an automobile includes a plurality of reflectors each sharing a common focus point, a light emitting diode array positioned at the common focus point, and a circular, non-optic window. The window fits through a standard-sized opening in an automobile fascia substantially two inches in diameter. The reflectors include a central reflector, a pair of lateral reflectors surrounding the central reflector and angled toward a center axis of the fog lamp, and a pair of converging reflectors surrounding the lateral reflectors and angled more sharply toward the center axis of the fog lamp. The central reflector and lateral reflectors produce beams of reflected light through the outer circumference of the window. The converging reflectors produce beams of reflected light converging at a secondary focus point within the fog lamp and transmitting through the window.

6 Claims, 5 Drawing Sheets

(52) U.S. Cl.
CPC ........... *F21S 41/285* (2018.01); *F21S 41/335* (2018.01); *F21S 41/336* (2018.01); *F21S 41/36* (2018.01); *F21S 41/39* (2018.01); *F21S 41/43* (2018.01)

(58) Field of Classification Search
CPC .. F21S 48/1364; F21S 48/137; F21S 48/1388; F21S 48/145
See application file for complete search history.

(56) References Cited

U.S. PATENT DOCUMENTS

| | | | |
|---|---|---|---|
| 6,578,996 B1 * | 6/2003 | Kawashima | F21S 48/23 362/516 |
| 6,945,672 B2 | 9/2005 | Du et al. | |
| 7,011,438 B2 | 3/2006 | Schuster et al. | |
| 7,223,000 B2 | 5/2007 | Yamamura | |
| 7,237,927 B2 | 7/2007 | Coushaine et al. | |
| 7,441,928 B2 | 10/2008 | Futami | |
| 8,011,803 B2 * | 9/2011 | Cheung | F21S 48/1159 362/244 |
| 8,075,166 B2 | 12/2011 | Ohno et al. | |
| 8,132,947 B2 * | 3/2012 | Shih | B60Q 1/0041 362/547 |
| 9,327,640 B2 | 5/2016 | Harrington | |
| 2004/0114366 A1 * | 6/2004 | Smith | F21S 48/328 362/247 |
| 2010/0135036 A1 | 6/2010 | Matsuba et al. | |
| 2012/0201043 A1 * | 8/2012 | DiPenti | F21S 48/1104 362/545 |

* cited by examiner

LED FOG LAMP

CROSS-REFERENCE TO RELATED APPLICATIONS

This continuation application claims priority under 35 U.S.C. § 120 to U.S. patent application Ser. No. 13/753,145, now U.S. Pat. No. 9,327,640, filed on Jan. 29, 2013, which is expressly incorporated herein by reference.

Cross-reference is made to U.S. patent application Ser. No. 29/444,315, now U.S. Pat. No. D692,168, entitled "LED FOG LAMP," which is assigned to the same assignee as the present application, which is expressly incorporated herein by reference.

TECHNICAL FIELD

The present disclosure relates generally to automotive forward lighting and, more particularly, to an automotive fog lamp.

BACKGROUND

Automotive fog lamps are auxiliary forward lighting devices mounted low in the front fascia of an automobile. Fog lamps direct light low and toward the ground to provide improved visibility during poor weather conditions. The automobile industry has defined a standard opening in the front fascia for fog lamps that is circular in shape and approximately two inches in diameter. Such opening is the smallest standard front fascia opening for forward lighting.

Traditional "projector" automotive fog lamps include a halogen light bulb surrounded by a polyellipsoidal reflector, which is covered by a glass aspheric condensing lens. Such projector fog lamps usually include a shade obstructing a large portion of the light path out of the lamp, in order to create a top cutoff in the produced light pattern and thereby reduce glare. In operation, traditional halogen fog lamps typically consume about 55 watts of electrical power. Traditional halogen fog lamps typically have optical efficiency of about 18 percent.

Light-emitting diode (LED) light sources provide an efficient light source. LEDs for automotive applications typically consume about 12 watts of electrical power in operation. LEDs also generally have much longer expected lifetimes than halogen light bulbs. However, LEDs differ from halogen light bulbs in several characteristics. LEDs typically produce lower amounts of luminous flux. Additionally, the longevity and light production of LEDs are both sensitive to operating temperature, requiring thermal management.

SUMMARY

According to one aspect of the disclosure, a fog lamp for an automobile is disclosed. The fog lamp includes a circular transparent window, the window having a center, an outer circumference, and a lamp axis extending through the center, a plurality of reflectors positioned behind the window, each reflector being operable to produce reflected rays of light and having a focus located at a common focus point located between the reflectors and the window, and a light emitting diode (LED) array positioned at the common focus point, the LED array being operable to direct light toward the plurality of reflectors. The plurality of reflectors includes a central reflector having a principal axis that extends parallel to the lamp axis, and a pair of lateral reflectors positioned on opposite sides of the central reflector. Each lateral reflector has a first edge connected to the central reflector and a concave surface extending from the first edge to a second edge. Each lateral reflector is operable to produce a first reflected ray having an origin located on the first edge, the first reflected ray extending across the lamp axis and through the outer circumference of the window, and a second reflected ray having an origin located on the second edge, the second reflected ray extending away from the lamp axis and through the outer circumference of the window.

In some embodiments, the fog lamp may include an external housing adapted for installation in the automobile. The window may be sized to fit through an opening in the front fascia of the automobile that is approximately two inches in diameter.

In some embodiments, the fog lamp may include a shade positioned behind the window. The LED array may be operable to generate a plurality of source light rays directed toward the plurality of reflectors. The shade may be configured to prevent the source light rays from being transmitted through the window.

In some embodiments, a first angle may be defined between the first reflected ray and the lamp axis, the angle having a magnitude of 37 degrees, and a second angle may be defined between the second reflected ray and the lamp axis, the second angle having a magnitude of 10 degrees.

In some embodiments, the central reflector may include a first edge, a second edge, and a concave surface connecting the first and second edges. The central reflector may be operable to produce (i) a first reflected ray having an origin located on the first edge, the first reflected ray extending away from the lamp axis and through the outer circumference of the window, and (ii) a second reflected ray having an origin located on the second edge, the second reflected ray extending away from the lamp axis and through the outer circumference of the window. In some embodiments, a first angle may be defined between the first reflected ray produced by the central reflector and the lamp axis, the first angle having a magnitude of 22 degrees, and a second angle may be defined between the second reflected ray produced by the central reflector and the lamp axis, the second angle having a magnitude of 22 degrees.

In some embodiments, the pair of lateral reflectors may be a first pair of lateral reflectors, and the plurality of reflectors further may include a second pair of lateral reflectors. Each of the second pair of lateral reflectors may have a first edge connected to the second edge of one of the first pair of lateral reflectors, a concave surface extending from the first edge to a second edge, and a second focus positioned between the reflectors and the window. Each of the second pair of lateral reflectors may be operable to produce a first reflected ray having an origin located on the first edge of the lateral reflector, the first reflected ray extending away from the lamp axis and through the second focus, and a second reflected ray having an origin located on the second edge of the lateral reflector, the second reflected ray extending across the lamp axis and through the second focus. In some embodiments, the first reflected ray produced by each of the second pair of lateral reflectors may extend through the outer circumference of the window. In some embodiments, a first angle may be defined between the first reflected ray produced by each of the second pair of lateral reflectors and the lamp axis, the angle having a magnitude of 8 degrees, and a second angle may be defined between the second reflected ray produced by each of the second pair of lateral reflectors and the lamp axis, the second angle having a magnitude of 40 degrees.

In some embodiments, the reflected rays of light produced by the plurality of reflectors may be substantially collimated vertically and angled downward.

According to another aspect, a fog lamp for an automobile includes a circular transparent window, the window having a diameter of approximately two inches, a center, an outer circumference, and a lamp axis extending through the center, a plurality of reflectors positioned behind the window, each reflector being operable to produce reflected rays of light and having a focus located at a common focus point, and a light emitting diode (LED) array positioned substantially at the common focus point, the LED array being operable to direct light toward the plurality of reflectors. The plurality of reflectors includes a central reflector and a lateral reflector positioned on one side of the central reflector. The central reflector includes a principal axis that extends parallel to the lamp axis. The central reflector has a first edge, a second edge, and a concave surface connecting the first and second edges. The central reflector is operable to produce a first reflected ray having an origin located on the first edge, the first reflected ray extending away from the lamp axis and through the outer circumference of the window, and a second reflected ray having an origin located on the second edge, the second reflected ray extending away from the lamp axis and through the outer circumference of the window. The lateral reflector includes a first edge connected to the central reflector and a concave surface extending from the first edge to a second edge. The lateral reflector has a principal axis that intersects the lamp axis in front of the reflectors. The lateral reflector is operable to produce a first reflected ray having an origin located on the first edge of the lateral reflector, the first reflected ray extending across the lamp axis and through the outer circumference of the window, and a second reflected ray having an origin located on the second edge of the lateral reflector, the second reflected ray extending away from the lamp axis and through the outer circumference of the window. In some embodiments, the first and second reflected rays produced by the central reflector define a beam of light having a full angle divergence of 44 degrees.

In some embodiments, the lateral reflector is a first lateral reflector, and the plurality of reflectors further may include a second lateral reflector positioned on another side of the central reflector. The second lateral reflector includes a first edge connected to the central reflector and a concave surface extending from the first edge to a second edge. The second lateral reflector has a principal axis that intersects the lamp axis and the principal axis of the first lateral reflector at a common point in front of the reflectors. The second lateral reflector is operable to produce a first reflected ray having an origin located on the first edge of the second lateral reflector, the first reflected ray extending across the lamp axis and through the outer circumference of the window, and a second reflected ray having an origin located on the second edge of the second lateral reflector, the second reflected ray extending away from the lamp axis and through the outer circumference of the window. The first and second reflected rays produced by each of the lateral reflectors define a beam of light having a full angle divergence of 47 degrees.

In some embodiments, the fog lamp may further include a converging reflector. The converging reflector has a first edge connected to the second edge of the lateral reflector, a concave surface extending from the first edge to a second edge, and a second focus positioned behind the window. The converging reflector has a principal axis that intersects the lamp axis in front of the reflectors. The converging reflector is operable to produce a first reflected ray having an origin located on the first edge of the converging reflector, the first reflected ray extending away from the lamp axis through the second focus of the lateral reflector and through the window, and a second reflected ray having an origin located on the second edge of the converging reflector, the second reflected ray extending across the lamp axis through the second focus of the lateral reflector and through the window.

In some embodiments, the fog lamp may further include an external housing adapted for installation in the automobile, wherein the window is sized to fit through a fog lamp opening in the front fascia of the automobile. In some embodiments, the fog lamp further may include a shade positioned behind the window. The LED array may be operable to generate a plurality of source light rays directed toward the plurality of reflectors. The shade may be configured to prevent the source light rays from being transmitted through the window. In some embodiments, the reflected rays of light produced by the plurality of reflectors may be substantially collimated vertically and angled downward.

In another aspect, a fog lamp for an automobile includes a circular transparent window, the window having a center, an outer circumference, and a lamp axis extending through the center, a plurality of reflectors positioned behind the window, each reflector being operable to produce reflected rays of light and having a focus located at a common focus point located between the reflectors and the window, a light emitting diode (LED) array centered at the common focus point, the LED array being operable to generate a plurality of source light rays directed toward the plurality of reflectors, a flat, corrugated reflective surface connected to a bottom edge of the plurality of reflectors and extending toward the window, and a shade positioned behind the window, the shade being configured to prevent the source light rays from being transmitted through the window. The plurality of reflectors includes a central reflector having a principal axis that extends parallel to the lamp axis, the central reflector being operable to reflect rays of light through the window, a pair of lateral reflectors positioned on opposite sides of the central reflector, and a pair of converging reflectors positioned outboard of the lateral reflectors. Each lateral reflector has a principal axis that intersects the lamp axis in at a common point in front of the reflectors. Each lateral reflector is operable to reflect rays of light through the window. Each converging reflector has a first edge connected to one of the pair of lateral reflectors, a concave surface extending from the first edge to a second edge, and a second focus positioned behind the window. Each converging reflector having a principal axis that intersects the lamp axis at a common point in front of the reflectors. Each converging reflector is operable to produce a first reflected ray having an origin located on the first edge, the first reflected ray extending away from the lamp axis, through the second focus of the lateral reflector, and through the window, and a second reflected ray having an origin located on the second edge, the second reflected ray extending across the lamp axis, through the second focus of the lateral reflector, and through the window.

In some embodiments, the reflected rays produced by the central reflector may define a beam of light having a full angle divergence of 44 degrees. The reflected rays produced by each lateral reflector may define a beam of light having a full angle divergence of 47 degrees. The first reflected ray produced by each converging reflector may define an angle relative the lamp axis having a magnitude of 8 degrees, and the second reflected ray produced by each converging reflector may define an angle relative the lamp axis having a magnitude of 40 degrees. In some embodiments, the reflected rays of light produced by the plurality of reflectors may be substantially collimated vertically and angled downward.

BRIEF DESCRIPTION OF THE DRAWINGS

The detailed description particularly refers to the following figures, in which.

DETAILED DESCRIPTION OF THE DRAWINGS

Figure 1:
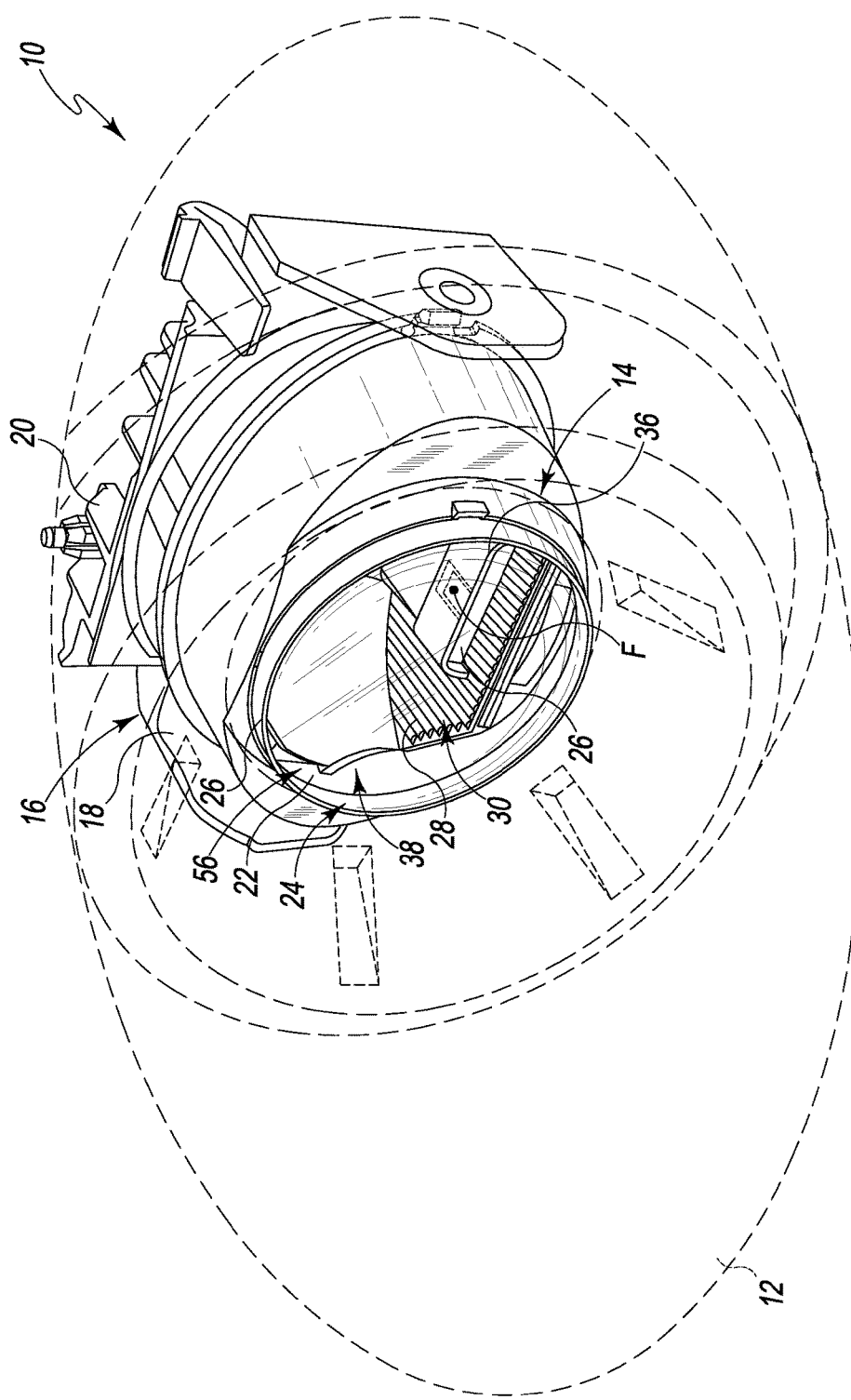
FIG. 1 is a perspective view of an LED fog lamp positioned in a fascia of an automobile.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 2:
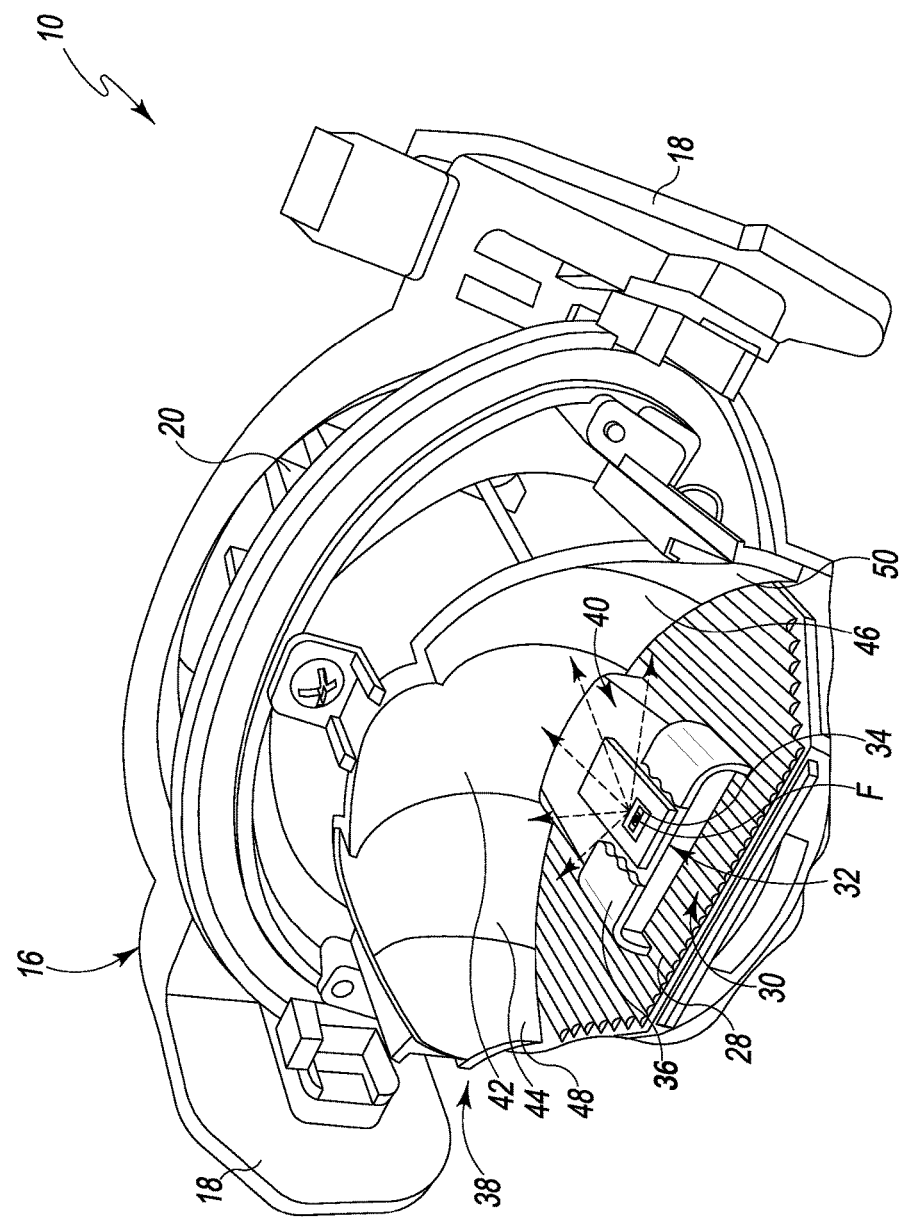
FIG. 2 is a perspective view of interior components of the LED fog lamp of FIG. 1.

Referring now to FIGS. 1 and 2, an LED fog lamp 10 is shown. The fog lamp 10 is positioned in a front fascia 12 of an automobile. The front fascia 12 includes a circular fog lamp opening 14 approximately two inches in diameter. The disclosed fog lamp 10 may be used as a direct replacement for a traditional halogen fog lamp.

The fog lamp 10 includes a housing 16 that covers and protects the internal components of the fog lamp 10 from water, road grime, and other debris. Additionally, the housing 16 includes mounting clips 18, which attach to corresponding receiving surfaces of the automobile. In other embodiments the housing 16 may include other mounting hardware, such as threaded holes for receiving screws or bolts. The housing 16 may be constructed from any suitably durable material, including a plastic material such as acrylonitrile butadiene styrene ("ABS") plastic or a metallic material such as aluminum.

The housing 16 includes a heat sink 20 surrounding the bottom and back side of the fog lamp 10. The heat sink 20 dissipates waste heat generated by the fog lamp 10 in operation. The back side of the heat sink 20 includes fins shaped to facilitate heat transfer to surrounding air. The heat sink 20 is constructed from aluminum. In other embodiments, the heat sink 20 may be constructed from any thermally conductive material. The heat sink 20 has a non-reflective surface finish; that is, the heat sink 20 absorbs stray light produced by the fog lamp 10 to reduce glare. The heat sink 20 is a separate subcomponent of the housing 16. In other embodiments, the heat sink 20 may be an integral part of the housing 16.

The fog lamp 10 includes a circular window 22 in the front of the housing 16. The window 22 is transparent and is sized to fit through the fog lamp opening 14 in the front fascia 12 of the automobile. In the illustrative embodiment, the window 22 is approximately two inches in diameter. The window 22 is "non-optical"—that is, the window 22 does not substantially refract light as the light passes through the window. The window 22 has a substantially constant cross-sectional thickness throughout. The window 22 has a curved front surface 56. In other embodiments, the front surface 56 of the window 22 may be flat. The window 22 is constructed from polycarbonate plastic. In other embodiments, the window 22 may be constructed of other transparent or semi-transparent material, such as glass. Because the window 22 is circular, the window 22 has an outer circumference 24. The window 22 is secured to the housing 16 via a circular trim bezel 26.

As shown in FIG. 2, the fog lamp 10 includes a reflective bottom surface 28. The bottom surface 28 is attached to the heat sink 20. The bottom surface 28 reflects any stray light produced by the fog lamp 10. The bottom surface 28 includes corrugations 30 to produce a smoother transition from light to dark at the edge of the reflected light beam, that is, a softer "cutoff." The bottom surface 28 has an opening 32 near its center, through which the heat sink 20 is accessible.

The fog lamp 10 includes an LED array 34 positioned inside the fog lamp 10, in the opening 32 of the bottom surface 28. The LED array 34 is attached to the heat sink 20, which dissipates excess heat generated by the LED array 34. The LED array 34 includes four individual LEDs arranged in a linear array. Each LED of the LED array 34 is operable to direct a plurality of source light rays 40 toward the rear of the housing 16. To efficiently direct the peak of intensity of the source light rays 40 toward the rear of the housing 16, the surface of the heat sink 20 upon which the LED array 34 is attached may be angled toward the rear of the housing 16 at an angle of ten degrees. The LED array 34 may be connected to a standard electrical system of the automobile (e.g., 12 volts DC power) using a pair of wires (not shown). In use, the LED array 34 produces about 850 lumens of luminous flux while consuming about 12 watts of power. In one embodiment, the LED array 34 may be a LUXEON® Altilon LAFL-C4S-0850, commercially available from Philips Lumileds Lighting Company. In other embodiments, the LED array 34 may include a single LED or any number of LEDs.

The fog lamp 10 also includes a shade 36 that is attached to the bottom surface 28 and positioned above the LED array 34. The shade 36 is positioned to shield the LED array 34 and prevent stray light produced by the LED array 34 from exiting through the window 22 without first being reflected off of the plurality of reflectors 38, as described in more detail below.

The fog lamp 10 includes a plurality of reflectors 38 that are positioned inside the housing 16. As described above, each LED of the LED array 34 is operable to direct a plurality of source light rays 40 toward the rear of the housing 16. The reflectors 38 are configured to reflect the source light rays 40 toward the front of the housing 16 through the window 22, as described in greater detail below.

As shown in FIG. 2, the reflectors 38 include a central reflector 42 and a pair of lateral reflectors 44, 46 positioned on each side of the central reflector 42. The reflectors 38 also include an outer reflector 48 positioned on the outer side of the lateral reflector 44 and another outer reflector 50 positioned on the outer side of the lateral reflector 46. The reflectors 38 are formed as a single monolithic piece of aluminum-coated ABS plastic. In other embodiments, the reflectors 38 may be made of other reflective materials. It should also be appreciated that in other embodiments one or more the reflectors may be formed separately for later assembly.

Figure 3:
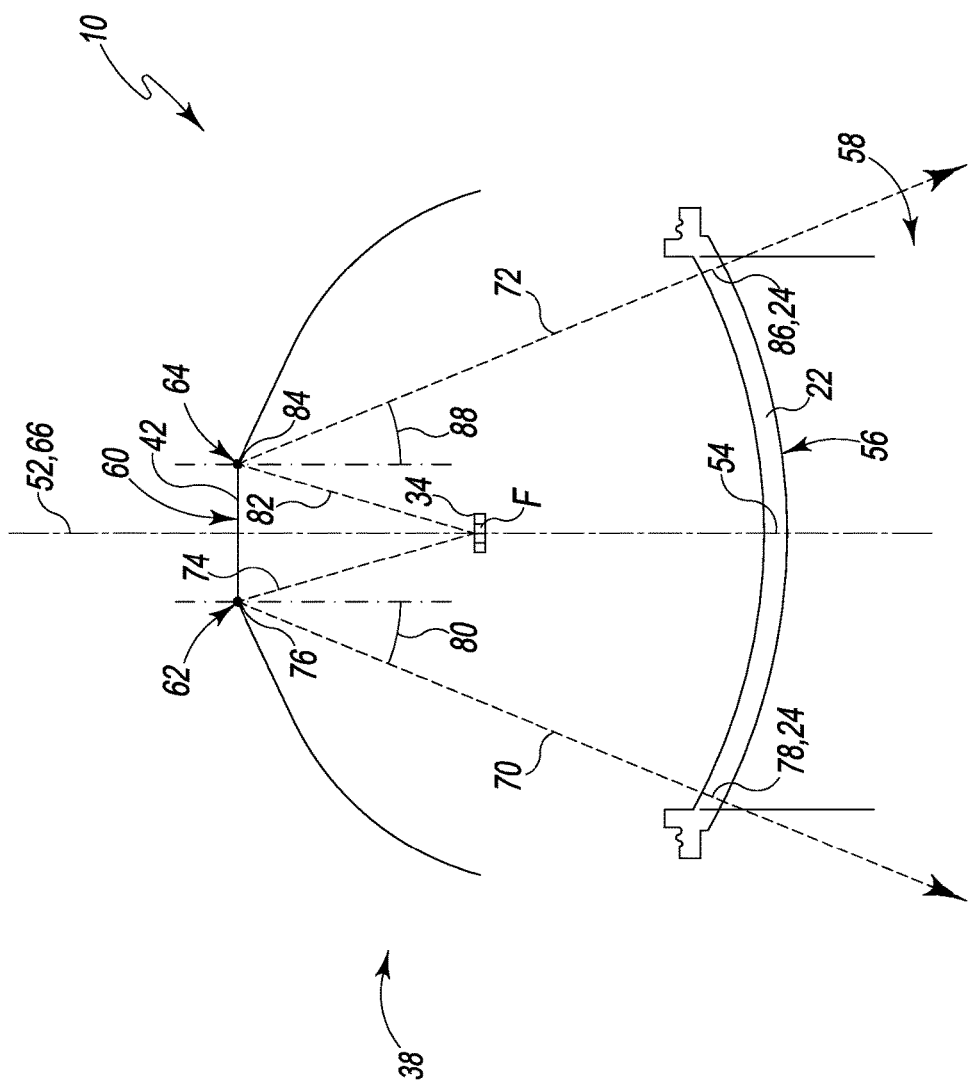
FIG. 3 is a schematic diagram of one aspect of the interior components of the LED fog lamp of FIGS. 1 and 2.

Referring now to FIG. 3, the fog lamp 10 has a lamp axis 52 that extends longitudinally through the housing 16 and a center 54 of the window 22. Each of the reflectors 38 has at least one optical focus positioned on the lamp axis 52. In the illustrative embodiment, the reflectors 38 have a common focus point F that is positioned on the lamp axis 52. As shown in FIG. 3, the LED array 34 is positioned at the common focus point F. In the illustrative embodiment, the focus point F is located 26.5 millimeters behind the front surface 56 of the window 22.

The lamp axis 52 bisects the central reflector 42, which is operable to produce a plurality of reflected light rays 58 from the source light rays 40 produced by the LED array 34. The central reflector 42 has a reflective surface 60 that extends upwardly from the reflective bottom surface 28. The reflective surface 60 is concave and extends between an edge 62 and an edge 64. In the illustrative embodiment, the concave shape of the reflective surface 60 is configured to produce divergent reflected light rays 58. In other embodiments, the central reflector 42 may have any shape capable of producing the required beam of reflected light, for example, spherical, aspheric, parabolic, hyperbolic, or flat. In the illustrative embodiment, the central reflector 42 is positioned 47.585 millimeters behind the front surface 56 of the window 22.

As described above, the central reflector 42 has a common focus point F that is positioned on the lamp axis 52. The central reflector 42 includes a principal axis 66 that extends through an apex 68 of the concave reflective surface 60 and the common focus point F. In the illustrative embodiment, the principal axis 66 is aligned with, and extends parallel to, the lamp axis 52.

As shown in FIG. 3, the plurality of reflected light rays 58 produced by the central reflector 42 include a reflected ray 70 and a reflected ray 72. The reflected ray 70 is produced when a source light ray 74 from the LED array 34 intersects the edge 62 of the central reflector 42 at a point 76. The reflected ray 70 extends outwardly from the point 76 through the window 22 at a point 78 on the outer circumference 24 thereof. The reflected ray 70 extends away from the lamp axis 52 such that an angle 80 is defined between the ray 70 and the lamp axis 52. In the illustrative embodiment, the magnitude of the angle 80 is approximately 22 degrees.

The reflected ray 72 from the central reflector 42 is produced when a source light ray 82 from the LED array 34 intersects the edge 64 of the central reflector 42 at a point 84. The reflected ray 72 extends outwardly from the point 84 through the window 22 at a point 86 on the outer circumference 24 thereof. The reflected ray 72 extends away from the lamp axis 52 such that an angle 88 is defined between the ray 72 and the lamp axis 52. In the illustrative embodiment, the magnitude of the angle 88 is approximately 22 degrees. Because the magnitudes of the angles 80, 88 of the reflected rays 70, 72 total 44 degrees, the central reflector 42 is configured to produce a diverging beam of light with full-angle beam divergence of 44 degrees.

Figure 4:
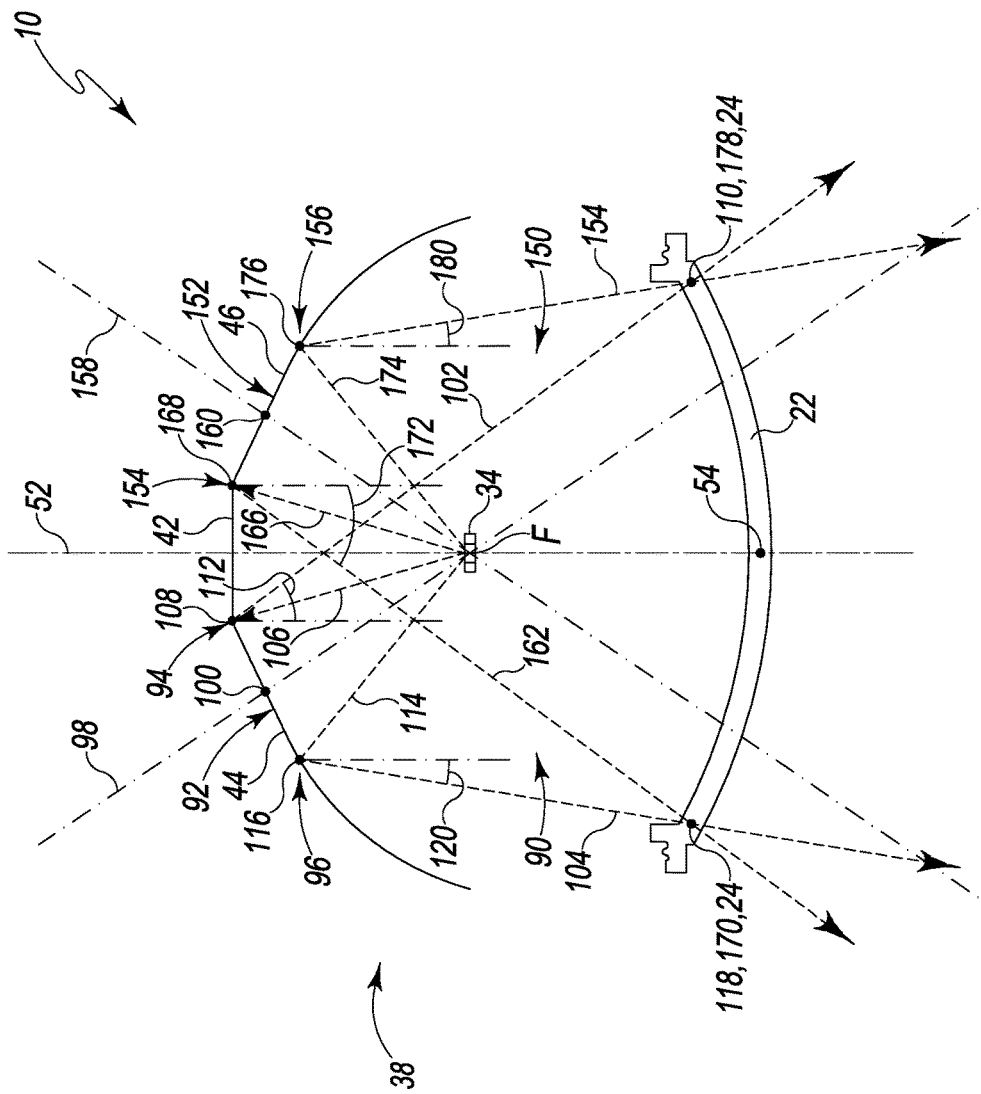
FIG. 4 is a schematic diagram of another aspect of the interior components of the LED fog lamp of FIGS. 1 and 2.

Referring now to FIG. 4, the reflectors 38 include the lateral reflector 44 positioned on one side of the central reflector 42. The lateral reflector 44 is operable to produce a plurality of reflected light rays 90 from the source light rays 40 produced by the LED array 34. The lateral reflector 44 has a reflective surface 92 that extends upwardly from the reflective bottom surface 28. The reflective surface 92 is concave and extends between an edge 94 and an edge 96. The edge 94 connects to the edge 62 of the central reflector 42. In the illustrative embodiment, the concave shape of the reflective surface 92 is configured to produce divergent reflected light rays 90. In other embodiments, the lateral reflector 44 may have any shape capable of producing the required beam of reflected light, for example, spherical, aspheric, parabolic, hyperbolic, or flat.

As described above, the lateral reflector 44 has a common focus point F with the other reflectors 38 that is positioned on the lamp axis 52. The lateral reflector 44 includes a principal axis 98 that extends through an apex 100 of the concave reflective surface 92 and the common focus point F.

As shown in FIG. 4, the plurality of reflected light rays 90 produced by the lateral reflector 44 include a reflected ray 102 and a reflected ray 104. The reflected ray 102 is produced when a source light ray 106 from the LED array 34 intersects the edge 94 of the lateral reflector 44 at a point 108. The reflected ray 102 extends outwardly from the point 108 through the window 22 at a point 110 on the outer circumference 24 thereof. The reflected ray 102 extends across the lamp axis 52 such that an angle 112 is defined between the ray 102 and the lamp axis 52. In the illustrative embodiment, the magnitude of the angle 112 is approximately 37 degrees.

The reflected ray 104 from the lateral reflector 44 is produced when a source light ray 114 from the LED array 34 intersects the edge 96 of the lateral reflector 44 at a point 116. The reflected ray 104 extends outwardly from the point 116 through the window 22 at a point 118 on the outer circumference 24 thereof. The reflected ray 104 extends away from the lamp axis 52 such that an angle 120 is defined between the ray 104 and the lamp axis 52. In the illustrative embodiment, the magnitude of the angle 120 is approximately 10 degrees. Because the magnitudes of the angles 112, 120 of the reflected rays 102, 104 total 47 degrees, the lateral reflector 44 is configured to produce a diverging beam of light with full-angle beam divergence of 47 degrees.

As described above, the reflectors 38 include the second lateral reflector 46 positioned on the other side of the central reflector 42. The lateral reflector 46 is operable to produce a plurality of reflected light rays 150 from the source light rays 40 produced by the LED array 34. The lateral reflector 46 has a reflective surface 152 that extends upwardly from the reflective bottom surface 28. The reflective surface 152 is concave and extends between an edge 154 and an edge 156. The edge 154 connects to the edge 64 of the central reflector 42. In the illustrative embodiment, the concave shape of the reflective surface 152 is configured to produce divergent reflected light rays 150. In other embodiments, the lateral reflector 46 may have any shape capable of producing the required beam of reflected light, for example, spherical, aspheric, parabolic, hyperbolic, or flat.

As described above, the lateral reflector 46 has a common focus point F with the other reflectors 38 that is positioned on the lamp axis 52. The lateral reflector 46 includes a principal axis 158 that extends through an apex 160 of the concave reflective surface 152 and the common focus point F.

As shown in FIG. 4, the plurality of reflected light rays 150 produced by the lateral reflector 46 include a reflected ray 162 and a reflected ray 164. The reflected ray 162 is produced when a source light ray 166 from the LED array 34 intersects the edge 154 of the lateral reflector 46 at a point 168. The reflected ray 162 extends outwardly from the point 168 through the window 22 at a point 170 on the outer circumference 24 thereof. The reflected ray 162 extends across the lamp axis 52 such that an angle 172 is defined between the ray 162 and the lamp axis 52. In the illustrative embodiment, the magnitude of the angle 172 is approximately 37 degrees.

The reflected ray 164 from the lateral reflector 46 is produced when a source light ray 174 from the LED array 34 intersects the edge 156 of the lateral reflector 46 at a point 176. The reflected ray 164 extends outwardly from the point 176 through the window 22 at a point 178 on the outer circumference 24 thereof. The reflected ray 164 extends away from the lamp axis 52 such that an angle 180 is defined between the ray 164 and the lamp axis 52. In the illustrative embodiment, the magnitude of the angle 180 is approximately 10 degrees. Because the magnitudes of the angles 172, 180 of the reflected rays 162, 164 total 47 degrees, the lateral reflector 46 is configured to produce a diverging beam of light with full-angle beam divergence of 47 degrees.

Figure 5:
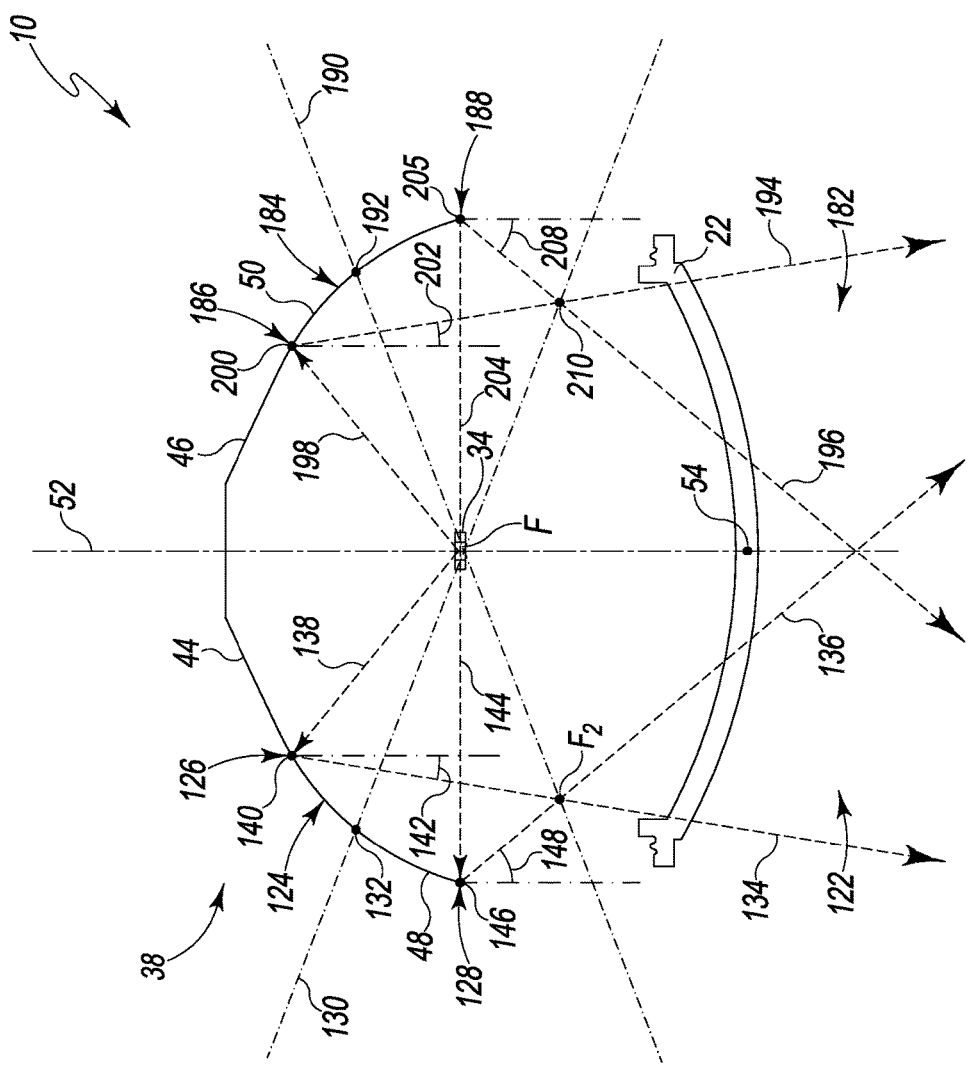
FIG. 5 is a schematic diagram of a third aspect of the interior components of the LED fog lamp of FIGS. 1 and 2.

Referring now to FIG. 5, the reflectors 38 include the outer reflector 48 positioned on one side of the lateral reflector 44. The outer reflector 48 is operable to produce a plurality of reflected light rays 122 from the source light rays 40 produced by the LED array 34. The outer reflector 48 has a reflective surface 124 that extends upwardly from the reflective bottom surface 28. The reflective surface 124 is concave and extends between an edge 126 and an edge 128. The edge 126 connects to the edge 96 of the lateral reflector 44. In the illustrative embodiment, the concave shape of the reflective surface 124 is configured to produce convergent reflected light rays 122. In other embodiments, the outer reflector 48 may have any shape capable of producing the required beam of reflected light, for example, spherical, aspheric, hyperbolic, or flat.

As described above, the outer reflector 48 has a common focus point F with the other reflectors 38 that is positioned on the lamp axis 52. The outer reflector 48 includes a principal axis 130 that extends through an apex 132 of the concave reflective surface 124 and the common focus point F. The outer reflector 48 has a secondary focus point $F_2$ located within the fog lamp 10, behind the window 22.

As shown in FIG. 5, the plurality of reflected light rays 122 produced by the outer reflector 48 include a reflected ray 134 and a reflected ray 136. The reflected ray 134 is produced when a source light ray 138 from the LED array 34 intersects the edge 126 of the outer reflector 48 at a point 140. The reflected ray 134 extends outwardly from the point 140 through the secondary focus point $F_2$. The reflected ray 134 extends away from the lamp axis 52 such that an angle 142 is defined between the ray 134 and the lamp axis 52. In the illustrative embodiment, the magnitude of the angle 142 is approximately 8 degrees.

The reflected ray 136 from the outer reflector 48 is produced when a source light ray 144 from the LED array 34 intersects the edge 128 of the outer reflector 48 at a point 146. The reflected ray 136 extends outwardly from the point 146 through the secondary focus point $F_2$. The reflected ray 136 extends across from the lamp axis 52 such that an angle 148 is defined between the ray 136 and the lamp axis 52. In the illustrative embodiment, the magnitude of the angle 148 is approximately 40 degrees.

As described above, the reflectors 38 include the second outer reflector 50 positioned on one side of the lateral reflector 46. The outer reflector 50 is operable to produce a plurality of reflected light rays 182 from the source light rays 40 produced by the LED array 34. The outer reflector 50 has a reflective surface 184 that extends upwardly from the reflective bottom surface 28. The reflective surface 184 is concave and extends between an edge 186 and an edge 188. The edge 186 connects to the edge 156 of the lateral reflector 46. In the illustrative embodiment, the concave shape of the reflective surface 184 is configured to produce convergent reflected light rays 182. In other embodiments, the outer reflector 50 may have any shape capable of producing the required beam of reflected light, for example, spherical, aspheric, hyperbolic, or flat.

As described above, the outer reflector 50 has a common focus point F with the other reflectors 38 that is positioned on the lamp axis 52. The outer reflector 50 includes a principal axis 190 that extends through an apex 192 of the concave reflective surface 184 and the common focus point F. The outer reflector 50 has a secondary focus point 210 located within the fog lamp 10, behind the window 22.

As shown in FIG. 5, the plurality of reflected light rays 182 produced by the outer reflector 50 include a reflected ray 194 and a reflected ray 196. The reflected ray 194 is produced when a source light ray 198 from the LED array 34 intersects the edge 186 of the outer reflector 50 at a point 200. The reflected ray 194 extends outwardly from the point 200 through the secondary focus point 210. The reflected ray 194 extends away from the lamp axis 52 such that an angle 202 is defined between the ray 194 and the lamp axis 52. In the illustrative embodiment, the magnitude of the angle 202 is approximately 8 degrees.

The reflected ray 196 from the outer reflector 50 is produced when a source light ray 204 from the LED array 34 intersects the edge 188 of the outer reflector 50 at a point 206. The reflected ray 196 extends outwardly from the point 206 through the secondary focus point 210. The reflected ray 196 extends across from the lamp axis 52 such that an angle 208 is defined between the ray 196 and the lamp axis 52. In the illustrative embodiment, the magnitude of the angle 208 is approximately 40 degrees.

The preceding description of FIGS. 3-5 concerns the reflection of light laterally by the reflectors 38. Each of the reflectors 38 is also shaped vertically to produce substantially collimated reflected rays of light. The reflected rays of light angle downward such that the top cutoff of the reflected beam of light is directly below the horizon.

Alternate embodiments of the fog lamp 10 may include different arrangements of the plurality of reflectors 38. For example, in an alternate embodiment, each of the reflectors 38 may have two optical foci. In such alternate embodiment, each of the reflectors 38 shares a common focus point and produces reflect rays of light converging at the second focus point.

There are a plurality of advantages of the present disclosure arising from the various features of the apparatus and system described herein. It will be noted that alternative embodiments of the apparatus and system of the present disclosure may not include all of the features described yet still benefit from at least some of the advantages of such features. Those of ordinary skill in the art may readily devise their own implementations of the apparatus and system that incorporate one or more of the features of the present invention and fall within the spirit and scope of the present disclosure.

The invention claimed is:

1. A fog lamp for an automobile, comprising:

a transparent window, the window having a center, an outer circumference, and a lamp axis extending through the center, a plurality of reflectors positioned behind the window, each reflector being operable to produce reflected rays of light and having a focus located at a common focus point located between the reflectors and the window, a flat, corrugated reflective surface connected to a bottom edge of the plurality of reflectors, extending toward the window, and having an opening surrounding the common focus point, a light emitting diode (LED) array centered at the common focus point in the opening of the flat, corrugated reflective surface, the LED array being operable to generate a plurality of source light rays directed toward the plurality of reflectors, and a shade positioned behind the window, the shade being configured to prevent the source light rays from being transmitted through the window, wherein the plurality of reflectors includes:

a central reflector having a principal axis that extends parallel to the lamp axis, the central reflector being operable to reflect rays of light through the window, a pair of lateral reflectors positioned on opposite sides of the central reflector, (i) each lateral reflector having a principal axis that intersects the lamp axis at a common point in front of the reflectors, and (ii) each lateral reflector being operable to reflect rays of light through the window, and a pair of converging reflectors positioned outboard of the lateral reflectors, (i) each converging reflector having a first edge connected to one of the pair of lateral reflectors, a concave surface extending from the first edge to a second edge, and a second focus positioned behind the window, (ii) each converging reflector having a principal axis that intersects the lamp axis at a common point in front of the reflectors, and (iii) each converging reflector being operable to produce a first reflected ray having an origin located on the first edge, the first reflected ray extending away from the lamp axis, through the second focus of the converging reflector, and through the window, and a second reflected ray having an origin located on the second edge, the second reflected ray extending across the lamp axis, through the second focus of the converging reflector, and through the window.

2. The fog lamp of claim 1, further comprising:

an external housing adapted for installation in the automobile, wherein the window is sized to fit through an opening in a front fascia of the automobile that is approximately two inches in diameter.

3. The fog lamp of claim 1, wherein the first reflected ray produced by each of the pair of converging reflectors extends through the outer circumference of the window.

4. The fog lamp of claim 1, wherein:

a first angle is defined between the first reflected ray produced by each of the pair of converging reflectors and the lamp axis, the first angle having a magnitude of 8 degrees, and a second angle is defined between the second reflected ray produced by each of the pair of converging reflectors and the lamp axis, the second angle having a magnitude of 40 degrees.

5. The fog lamp of claim 1, wherein the reflected rays of light produced by the plurality of reflectors are substantially collimated vertically and angled downward.

6. The fog lamp of claim 1, wherein:

the reflected rays produced by the central reflector define a beam of light having a full angle divergence of 44 degrees, the reflected rays produced by each lateral reflector define a beam of light having a full angle divergence of 47 degrees, and the first reflected ray produced by each converging reflector defines an angle relative the lamp axis having a magnitude of 8 degrees, and the second reflected ray produced by each converging reflector defines an angle relative the lamp axis having a magnitude of 40 degrees.

* * * * *